MECHANICAL PENCIL WITH ERASER

Original Filed Oct. 28, 1957 2 Sheets-Sheet 1

INVENTOR.
Walter Carlos Anderton
BY Chas Denegre
Attorney.

MECHANICAL PENCIL WITH ERASER

Original Filed Oct. 28, 1957 2 Sheets-Sheet 2

INVENTOR.
Walter Carlos Anderton
BY Chas. Denegre
Attorney.

United States Patent Office

Re. 25,514
Reissued Jan. 21, 1964

25,514

MECHANICAL PENCIL WITH ERASER

Walter Carlos Anderton, Birmingham, Ala.

Original No. 2,941,509, dated June 21, 1960, Ser. No. 692,691, Oct. 28, 1957. Application for reissue Sept. 2, 1960, Ser. No. 53,861
2 Claims. (Cl. 120—22)

Matter enclosed in heavy brackets [ ] appears in the original patent but forms no part of this reissue specification; matter printed in italics indicates the additions made by reissue.

This invention relates to a mechanical pencil with eraser. It has for its main objects to provide such a pencil that will be highly satisfactory for the purpose intended, simple in structure, comparatively cheap to manufacture, easy to keep in working condition, and extremely durable.

A further object is to provide such a pencil with a satisfactory eraser mounted in its outer end portion for convenient use as desired.

Other objects and advantages will appear from the drawings and description.

Figure 2:
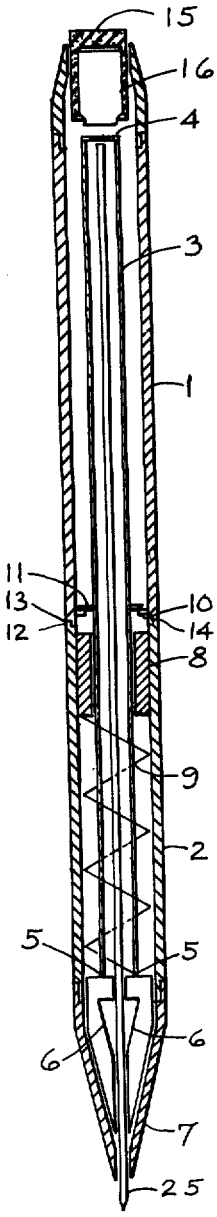
Figure 3:
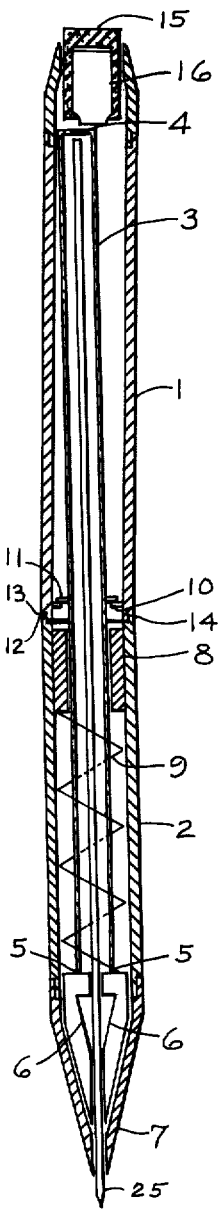
Figure 1:
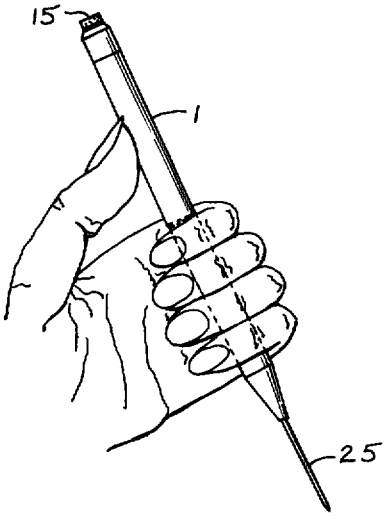
Figure 4:
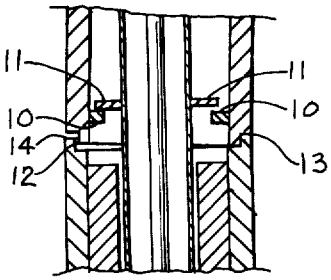
Figure 6:
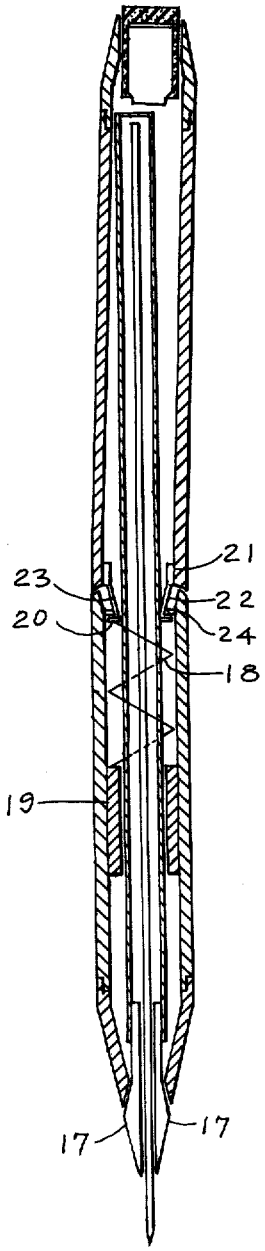
Figure 5:
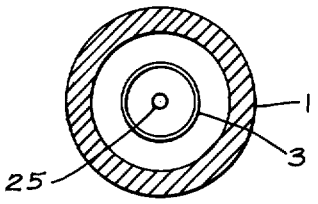
Figure 7:
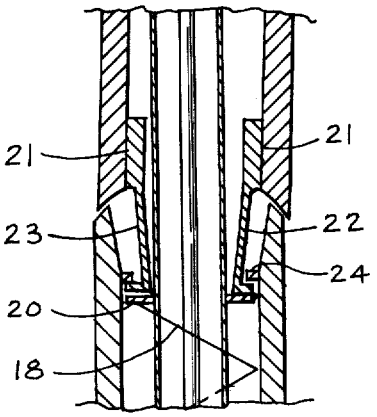

By referring generally to the drawings it will be observed that FIG. 1 is a general view of a hand holding a pencil made according to this invention, and indicating how the lower portion of the pencil is held while the thumb is used to bend the pencil to cause its mechanism to work; FIG. 2 is a center sectional view of the pencil in its normal straight drawing position; FIG. 3 is a center sectional view of the pencil in its tilted position of the upper half in relation to its lower half; FIG. 4 is an enlarged detail sectional view showing some of the working parts of the pencil; FIG. 5 is a cross sectional enlarged view of the main body parts and lead; FIG. 6 is a center sectional view of the pencil showing a modified form for control of the lead; and FIG. 7 is an enlarged sectional detail view of a modified form of the mechanism in the center of the pencil.

Similar reference numerals refer to similar parts throughout the several views.

Referring to the drawings in detail it will be seen that the pencil comprises a main round case having an upper part 1 and lower part 2. An inner tube 3 is closed at its top 4, or may be open, and has its lower end 5 attached to a chuck 6 having similar parts that are slidable in the pointed end portion 7 of the case. A first sleeve 8 is attached in the upper portion of the lower part of the case. The chuck as it is mounted in the V shaped lower end of the case will expand slightly when the pencil is bent by manual means as shown in FIG. 1 as a result of its parts being pulled toward the top of the case by the bending of the tube 3. This action releases the lead 25. When manual pressure is released the assembled pencil becomes straight causing the chuck to move slightly downward in the V shape portion and clamp the lead and hold it for use. A coil spring 9 is mounted in expanded tension in the case with its lower end in contact with the top edges of the chuck parts and with its top end adjacent the bottom edge of the sleeve. A washer 10 is attached by its edge to the inner face of the lower end portion of the upper part of the case. The tube 3 is inserted through the washer 10 attached in the case. A second washer 11 is attached on the tube and has its outer edge slightly away from the inner face of the case with the lower face of the tube washer in contact with the upper face of the case washer when the upper part of the case is in line for use with the lower part of the case. The lower end of the upper part of the case and the upper end of the lower part of the case are provided with a joint structure 12 that provides for one part to fit in the other as at 13 and 14 with the joint being held together by the tube washer being pulled downwardly by the spring causing the tube washer to exert pressure on the case washer. This structure provides a rockable joint and when the pencil is bent by manual means as indicated in FIG. 1 the chuck is pulled slightly inward thereby releasing the lead and allowing its point to move outward for sharpening and use.

An eraser 15 is mounted in the removable holder 16 thereof in the top end portion of the upper half of the case.

In FIGS. 6 and 7 a modified form of the pencil is shown having the chuck 17 shaped to clamp the lead when the chuck is pulled inward by the spring 18 mounted in expanded tension by one end adjacent the second sleeve 19 which is attached to the case with the other end of the spring against the washer 20 which is attached to the tube 3. A tapered sleeve 21 is attached to the inner face of the lower end of the upper case and extends as at 22 and 23 into the upper end of the lower case with its end under a narrow washer 24 that is attached to the inner face of the case and above the washer 20 which is attached to tube 3. This structure provides a rockable joint and when the pencil is bent the chuck is pushed slightly outward thereby releasing the lead 25 and allowing its point to move outwardly for sharpening and use.

In both structures of the pencil the tube always remains straight. Only the case is bent as a result of the rockable joints which control the lead 25 adapted to be exposed out of the point for sharping and use.

The various parts of the pencil may be made of any material suitable for the purpose, but I prefer to use good grades of metal, rubber, and writing lead; also the parts may be made in different sizes and capacities depending on the kind of work for which the pencils are to be used.

While I have shown and described the preferred embodiment of my invention, I do not wish to limit same to the exact and precise details of structure, and reserve the right to make all modifications and changes so long as they remain within the scope of the invention and the following claim.

Having described my invention I claim:

1. A mechanical lead pencil with eraser, of the character described comprising, an outer main case, said case having an upper part and a lower part, a connecting joint in the center portion of the case, a tube positioned in the center of the case, a chuck having a plurality of similar parts, said tube having its top end closed and its bottom end connected to the parts of the chuck, a round writing lead, said lead being within said tube and extending through said chuck, the lower end portion of the case being pointed and having its inner face in contact with the outer faces of said chuck parts; a sleeve attached in the upper end portion of the lower part of the case, a coil type spring, said spring being mounted in expanded tension in the lower part of the case with its bottom end in contact with said chuck and with its top end in contact with the bottom edge of said sleeve; said joint of the case parts having the lower edge of the upper part of the case inserted in the top edge of the lower part of the case, a washer, said washer being attached in the lower end portion of the upper part of the case, said tube being inserted through said washer, a second washer, said second washer being attached around said tube and positioned for its under face to be in contact with the upper face of the washer attached in the case, said coil spring being adapted by its tension to force the tube downward and hold the case parts together in line for use with each other, said spring being also adapted to be overcome by manual pressure applied to the entire case to thus slightly tilt the case at its joint and thereby release the grip of the chuck on the lead allowing its bottom end to move outward for sharpening and use; an eraser, said eraser being removably attached in the top end portion of the upper part of the case.

*2. A mechanical lead pencil having a case with an upper part and a lower part, said upper and lower parts being substantially rigid and connected to each other about a rockable joint so that the upper part may tilt relative to the lower part when pressure is applied thereto transversely of the longitudinal axis of the pencil, a chuck slidably positioned within the lower part adjacent the lower end thereof to grip a pencil lead when urged downwardly, an inner tube secured to the upper portion of the chuck and extending therefrom centrally through the lower part into the upper part of the case and surrounding a pencil lead held by the chuck, a spring within the case urging said inner tube and said chuck downwardly whereby the chuck grips the pencil lead, a projection secured to and extending about the outer circumference of said inner tube, and means on the upper part engaging the underside of said projection to form said rockable joint and moving with said upper part to cause longitudinal movement of said inner tube and chuck without any transverse movement through contact with the projection to move the chuck upwardly to release the lead.*

References Cited in the file of this patent or the original patent

UNITED STATES PATENTS

| | | |
|---|---|---|
| 149,842 | Deeds | Apr. 21, 1874 |
| 250,023 | Weissenborn | Nov. 22, 1881 |
| 261,455 | Hoffman | July 18, 1882 |
| 876,223 | Newman | Jan. 7, 1908 |
| 1,813,613 | Eslava | July 7, 1931 |
| 2,645,204 | Bross | July 14, 1953 |
| 2,680,358 | Zublin | June 8, 1954 |
| 2,899,931 | Bross | Aug. 18, 1959 |

FOREIGN PATENTS

| | | |
|---|---|---|
| 15,187 | Great Britain | Dec. 10, 1885 |
| 714,791 | Great Britain | Jan. 2, 1957 |
| 825,782 | Germany | Nov. 24, 1952 |
| 1,223,868 | France | Feb. 1, 1960 |